United States Patent
Remy et al.

(10) Patent No.: US 7,587,381 B1
(45) Date of Patent: Sep. 8, 2009

(54) METHOD FOR EXTRACTING A COMPACT REPRESENTATION OF THE TOPICAL CONTENT OF AN ELECTRONIC TEXT

(75) Inventors: Martin Remy, Highlands Ranch, CO (US); Steven Nieker, Seattle, WA (US)

(73) Assignee: Sphere Source, Inc., San Francisco, CA (US)

(*) Notice: Subject to any disclaimer, the term of this patent is extended or adjusted under 35 U.S.C. 154(b) by 311 days.

(21) Appl. No.: 10/350,869

(22) Filed: Jan. 24, 2003

Related U.S. Application Data

(60) Provisional application No. 60/351,334, filed on Jan. 25, 2002.

(51) Int. Cl.
*G06F 17/30* (2006.01)
(52) U.S. Cl. .............. 707/1; 715/254; 707/2; 707/3
(58) Field of Classification Search .......... 707/1–6; 704/9; 715/500, 513, 254
See application file for complete search history.

(56) References Cited

U.S. PATENT DOCUMENTS

| | | | | |
|---|---|---|---|---|
| 5,263,159 A | * | 11/1993 | Mitsui ........................ | 707/5 |
| 5,267,156 A | * | 11/1993 | Nomiyama ................. | 704/10 |
| 5,297,027 A | * | 3/1994 | Morimoto et al. .......... | 715/254 |
| 5,950,189 A | * | 9/1999 | Cohen et al. ................ | 707/3 |
| 6,510,406 B1 | * | 1/2003 | Marchisio ................... | 704/9 |
| 6,912,525 B1 | * | 6/2005 | Chipalkatti et al. ......... | 707/5 |
| 2002/0032682 A1 | * | 3/2002 | Kobayashi et al. .......... | 707/5 |
| 2002/0059161 A1 | * | 5/2002 | Li ............................... | 707/1 |
| 2002/0123994 A1 | * | 9/2002 | Schabes et al. .............. | 707/5 |

\* cited by examiner

*Primary Examiner*—Don Wong
*Assistant Examiner*—Sheree N Brown
(74) *Attorney, Agent, or Firm*—Perkins Coie LLP

(57) ABSTRACT

An electronic document is parsed to remove irrelevant text and to identify the significant elements of the retained text. The elements are assigned scores representing their significance to the topical content of the document. A matrix of element-pairs is constructed such that the matrix nodes represent the result of one or more functions of the scores and other attributes of the paired elements. The resulting matrix is a compact representation of topical content that affords great precision in information retrieval applications that depend on measurements of the relatedness of topical content.

20 Claims, 3 Drawing Sheets

| element | score | sentence set | index of earliest occurrence |
|---|---|---|---|
| race car | 1.00 | {1,2,4,6,8} | 1 |
| driver | 0.97 | {1,3,4,7,9} | 1 |
| track | 0.84 | {2,3,4} | 2 |
| speed | 0.64 | { 3,5,7 } | 3 |
| winner | 0.64 | {8,10} | 8 |
| race | 0.42 | {1,2,3,7} | 1 |
| cup | 0.4 | {9,10} | 9 |
| champagne | 0.37 | { 10 } | 10 |

| element | score | sentence set | index of earliest occurrence |
|---|---|---|---|
| race car | 1.00 | {1,2,4,6,8} | 1 |
| driver | 0.97 | {1,3,4,7,9} | 1 |
| track | 0.84 | {2,3,4} | 2 |
| speed | 0.64 | {3,5,7} | 3 |
| winner | 0.64 | {8,10) | 8 |
| race | 0.42 | {1,2,3,7} | 1 |
| cup | 0.4 | {9,10} | 9 |
| champagne | 0.37 | {10} | 10 |

*FIG. 1*

| | race car | driver | track | speed | winner | race | cup | champagne |
|---|---|---|---|---|---|---|---|---|
| race car | 0.000 | | | | | | | |
| driver | 0.985 | 0.000 | | | | | | |
| track | 0.920 | 0.910 | 0.000 | | | | | |
| speed | 0.000 | 0.810 | 0.740 | 0.000 | | | | |
| winner | 0.820 | 0.000 | 0.000 | 0.000 | 0.000 | | | |
| race | 0.710 | 0.700 | 0.630 | 0.530 | 0.000 | 0.000 | | |
| cup | 0.000 | 0.690 | 0.000 | 0.000 | 0.520 | 0.000 | 0.000 | |
| champagne | 0.000 | 0.000 | 0.000 | 0.000 | 0.510 | 0.000 | 0.385 | 0.000 |

*FIG. 2*

| element pair | SA |
|---|---|
| driver-race car | 0.985 |
| track-race car | 0.920 |
| track-driver | 0.840 |
| winner-race car | 0.820 |
| speed-driver | 0.810 |
| speed-track | 0.740 |
| race-race car | 0.710 |
| race-driver | 0.700 |
| cup-driver | 0.690 |
| race-track | 0.630 |
| speed-track | 0.530 |
| cup-speed | 0.520 |
| champagne-winner | 0.510 |
| champagne-cup | 0.385 |

*FIG. 3*

METHOD FOR EXTRACTING A COMPACT REPRESENTATION OF THE TOPICAL CONTENT OF AN ELECTRONIC TEXT

CROSS-REFERENCE TO A RELATED APPLICATION

This application claims a benefit of priority from U.S. Provisional Patent Application Ser. No. 60/351,334 filed on Jan. 25, 2002, the disclosure of which is hereby incorporated by reference in its entirety for all purposes.

FIELD OF THE INVENTION

The present invention generally concerns the field of information retrieval using structured representations of documents. In particular, the present invention concerns characterization of the topical content of documents based on their lexical content in an unsupervised manner.

BACKGROUND OF THE INVENTION

Much work has been done to develop systems in which representations of documents are used to facilitate information retrieval. Many of these systems rely on large numbers of training texts that have been pre-labeled by a human. Other systems utilize clustering or latent semantic indexing to categorize documents but are limited to a single category per document. Still other systems, such as the present invention, are capable of assigning multiple topics to a single document without relying on pre-labeled training texts. These systems typically represent the topical content of a document in a structured format, such as a vector or matrix.

Compact, structured representations of documents have long been used in information retrieval systems. [Salton, G. *The SMART Retrieval System Experiments in Automatic Document Processing*. Prentice Hall, Inc., Englewood Cliffs, N.J., 1971]. These usually take the form of multidimensional vectors in which the dimensions are words or phrases taken from the document, and the magnitude of a dimension is a measure of the frequency of occurrence of the word or phrase in the document.

In the simplest case, a document's vector is computed by making an entry in the vector for each unique word occurring in the document, and setting the magnitude of that word equal to the number of times it occurs in the document.

Variations of this simple case include filters on the words selected for inclusion in the vector (for example, eliminating words that do not contribute to a specific topical representation of the document, such as conjunctions; or eliminating words not present in a predetermined lexicon), stemming of words prior to computing frequency measures, as well as variations of the frequency measure itself, such as by inverse document frequency.

Also used by practitioners of vector-based information retrieval are vectors whose elements are not single words or phrases, but pairs or, more generally, groups of words or phrases. These are usually selected on the basis of co-occurrence, by which words or phrases are grouped as a vector element if they occur together, i.e. consecutively, in the document. The measure used to assign magnitudes to the elements of a vector formed in this manner is a relation on individual eligible words or phrases from the document. The value of this relation for a particular group of words is taken as the magnitude of the corresponding vector element.

BRIEF SUMMARY OF THE INVENTION

The present invention improves on the information retrieval systems discussed above by employing a new method of extracting and representing topical content for use in information retrieval systems, called Sentential Affinity (SA). Sentential Affinity is the method of analyzing the relationship between two significant words or phrases of a text document with respect to the relationships between the sentences within which the words or phrases are located.

The present invention represents the topical content of a selection of text as a matrix in which pairs of unique words and phrases extracted from the text are assigned values that measure the pair's contribution to the topical composition of the text. The value for a given pair of words and phrases is derived from the significance of the individual words and phrases' contribution to the text's topical composition and the relationships between the sentences in which those word and phrases occur within the text.

The process of extracting the representation of a text using this method (SA Analysis) results in a compact matrix representation of the text's topical content (the SA Matrix). This SA Matrix can be represented as a vector, or similar structure.

The advantage of using SA to represent a document's topical content, over systems that do not analyze the relationships between pairs of elements and the sentences in which they occur, is increased precision when employed by information retrieval systems, due to the robust coverage of topical content that SA produces.

BRIEF DESCRIPTION OF THE DRAWINGS

The invention, together with further advantages thereof, may best be understood by reference of the following description taken in conjunction with the accompanying drawings in which:

FIG. 1 shows a sample collection of elements that contribute significantly to the topical content of a document and those attributes of the elements relevant to the calculation of Sentential Affinity.

FIG. 2 shows a sample Sentential Affinity Matrix derived from the collection illustrated in FIG. 1.

FIG. 3 shows a sample vector representation of the sample SA Matrix illustrated in FIG. 2.

DESCRIPTION OF THE PREFERRED EMBODIMENT

The present invention provides methods for constructing a compact SA Matrix representing the topical content of a source electronic document. It should be understood that 'electronic document' refers to any electronic representation of prose text contained in computer memory, whether saved to a computer hard disk or not.

The process for constructing the SA Matrix starts with parsing an electronic document into one or more discrete sections representing structural components of the document. In the preferred embodiment, this step may act upon a document formatted in HTML or in XML that contains sections marked at <TITLE> . . . </TITLE> (the TITLE section), <BODY> . . . </BODY> (the BODY section), etc., and each so marked section is treated as a discrete structural section of the document. These sections and the text of the document they represent are stored in computer memory for later processing.

The preceding step may also act upon documents without internal structure, such as documents created by a word processing application, that have been rendered to plain ASCII text by an appropriate conversion tool. In the preferred embodiment, the entire text of such a document is treated as a the BODY section and the name of the file from which the document text is extracted is treated as the TITLE section. Optionally, as determined by a configuration parameter, the preferred embodiment may instead designate the first N number of characters of the BODY to be the TITLE, where N is also a configurable parameter and where the N may be adjusted upward or downward automatically so as to fall on a white space character and not in the middle of a word.

The document is also parsed to identify available meta data. In the preferred embodiment, the document is parsed to extract manually assigned keywords. However, it should be understood that the invention is easily configured to consider other meta data elements. The meta data elements so extracted are also stored in computer memory for later processing.

The discrete sections of text so far stored in memory are further processed to eliminate sections and subsections determined to dilute the topical content of the document. Several steps are employed in this processing.

a) Of the sections of text stored in memory, those predetermined to be irrelevant to the topical content are discarded. In the preferred embodiment, only the text sections representing the TITLE and BODY of a document are retained.

b) If the document is an HTML document, the BODY section is analyzed to identify and eliminate subsections of the BODY that are predetermined to be irrelevant to the topical content of the document (e.g. navigation elements of the HTML page). There are a variety of methods to this end available to those of ordinary skill in the art. In the preferred embodiment, the BODY is broken into subsections according to settings of configurable parameters and comprising one or more sentences or structural elements of the markup (e.g. paragraphs, tables, etc.). The subcomponents are analyzed for size, based on number of characters, and those components whose size falls below a configurable threshold value are discarded.

c) If the original text of the document contained markup (e.g. HTML, SGML, XML, etc.), the remaining text stored in memory and the meta data stored in memory is stripped of markup and reduced to a plain text representation.

The remaining sections of text, so processed, are considered to contain the topical content of the document and are referred to herein as the topical selections.

Similarly to the above examples, an embodiment of the present invention can be configured to analyze and select topical selections from electronic documents structured with a variety of markup languages and those of ordinary skill in the art will be familiar with methods for further dividing structured documents into additional topical selections, methods for imposing arbitrary structures on unstructured documents, and methods for eliminating from within a structural section any of a variety of subsections of text that can be arbitrarily designated to contribute insignificantly to the topical breadth of the document.

Once topical selections are designated, each is analyzed for significant words and phrases. Such analysis takes advantages of several readily available external methods known to those skilled in the art, such as:

d) a method for dividing a section of electronic prose text into sentences. In the preferred embodiment, the sentences of the topical selections are indexed according to a linear numbering for later identification, such that the numbers assigned to different topical selections do not overlap. Specifically, the sentences in the TITLE are numbered 1 to A; the sentences in the BODY from A+1 to B; etc.

e) a method of tokenizing the words within each sentence so identified as described in step (d). In the preferred embodiment, a tokenizer splits the sentence on white space and punctuation, optionally excluding hyphen, and optionally ignoring parenthesized sections of sentences.

f) a method for eliminating undesired tokens from each sentence. In the preferred embodiment, a probabilistic part-of-speech (POS) tagger is used to determine the POS of each word in the sentence and only words tagged as nouns, verb forms, adjectives, and adverbs are retained. It should be understood that those of ordinary skill in the art will recognize a variety of techniques for eliminating undesired words not utilized by the preferred embodiment but still falling within the scope and intent of the present invention, such as comparing the words of the sentence to a fixed lexicon of acceptable or unacceptable words.

g) a method for grouping sequences of words within each sentence into phrases. In the preferred embodiment, noun phrases are optionally constructed from sequences of adjectives and nouns, as determined by the setting of a configuration parameter. The noun phrases constructed in this manner are considered tokens, equivalently to single words retained from step (f).

h) a method for calculating a value for a token based on its significance in the document, referred to herein as the score. A number of functions are widely used for this and known to those of ordinary skill in the art. In the preferred embodiment, a non-IDF (inverse document frequency), normalized, relative frequency measure is used.

In addition to the above, commonly used methods, the following methods are further applied as part of the current analysis of the topical selections.

i) For each word and phrase token retained following steps (f) and (g) the index of each sentence in which the token occurs is stored in a set specific to that token, referred to herein as the sentence set. For example, if the phrase "race car" occurs in sentences three and five, the sentence set for the token "race car" is set to {3,5}.

j) For each token, the earliest sentence in which it occurs (in the preferred embodiment, the sentence with the lowest index number), referred to herein as the index of earliest occurrence, is identified and stored.

k) Optionally a bias is applied to the score of each token based on the topical selection from which the token was extracted, the composition of the sentence set derived for that token, or comparison of tokens to a predetermined list of tokens. For example, tokens in the TITLE might be multiplied by a bias factor of 1.05, giving them increased weight relative to tokens from the BODY, which is not so biased. In the preferred embodiment, bias factors are optional and configurable per topical selection.

The result of the analysis of the topical selections described in the preceding steps (d) through (k) is a collection comprising significant word and phrase tokens, referred to herein as elements, each associated with a number of derived attributes. Specifically, the set of derived attributes associated with each element comprises the element's score, the element's index of earliest occurrence, and the element's sentence set. After processing of all topical selections, one such collection exists for each topical selection.

The collections of elements and attributes resulting from the previous processing are next combined to form a similar but global collection for the whole document. In creating the global collection, the collections of elements for the various topical selections are compared to identify if any elements are present in more than one topical selection. An element present in a single topical selection is represented in the global collection by the attribute set already established for the element. However, an element present in more than one topical selection is represented by single element that is assigned a new, derived attribute set in which: the global score attribute is calculated as a function (in the preferred embodiment, the sum) of the scores of the multiple elements being combined; the global sentence set is calculated as a function (in the preferred embodiment, the union) of the sentence sets of the multiple elements being combined; and the index of earliest occurrence is calculated as the lowest index of earliest occurrence from among the elements being combined.

Having arrived at a global collection of unique, single-term or single-phrase elements according to the previous steps, each one having an attribute set comprising a score, a sentence set, and an index of earliest occurrence, determine whether some elements can be reduced to common stem forms. Those of ordinary skill in the art will recognize a variety of techniques for performing such stemming.

Those elements determined by such stemming to have a common stem are then combined to make a single element. For example, if the set of eligible elements contains both "car" and "cars", then these two elements are combined into a single element represented by the shorter form. For each set of elements so combined, the combined element is assigned a new, derived attribute set in which: the global score attribute is calculated as a function (in the preferred embodiment, the sum) of the scores of the multiple elements being combined; the global sentence set is calculated as a function (in the preferred embodiment, the union) of the sentence sets of the multiple elements being combined; and the index of earliest occurrence is calculated as the lowest index of earliest occurrence from among the elements being combined.

Again, to review, the product of the steps so far can be considered a single collection of significant words and phrases (the elements) and three magnitudes per element: its score; its sentence set; and its index of earliest occurrence.

An ordered list is next created from the global collection by sorting the list of elements in decreasing order of their score (FIG. 1). If two elements have the same score, that with the lowest index of earliest occurrence is ordered first.

The global collection of elements may be optionally truncated at this point to a length appropriate for further processing. This can be done in several ways, either by truncating the ordered list at a fixed length, by truncating at a predetermined score, or by using any other any other manner of truncation known to those of ordinary skill in the art. The N elements remaining after truncation will be the N elements with the highest weights in the original list, with equalities in weight between elements having been resolved by the values of the index of earliest occurrence, as previously described. In the preferred embodiment, the list is truncated at a fixed but configurable length.

A matrix is then constructed between unique pairs of elements from the combined list, such that each element from the list is paired with every element from the list and each pairing of two elements is represented by a node. Those of ordinary skill in the art will recognize that the matrix so constructed is symmetric, the element-pairs being considered unordered pairs, so that all element-pairs and their nodes of interest are represented in a half of the matrix. For example, if the elements that constitute the columns and rows of the matrix are ordered identically in the columns and row, it will be immediately clear that the nodes above (or below) the diagonal are redundant. FIG. 2 shows such a matrix, in which the nodes lying above the diagonal are recognized as redundant and ignored.

The nodes are next assigned values by means of the following steps, the final value for a given pair of elements being called the Sentential Affinity (SA) of that element-pair.

For each element-pair (a,b) comprising elements a and b, one representing a column in the matrix and the other a row, the elements a and be are first considered by the W(a,b). This function can take a number of different forms and can take into account not only the scores of a and b, as previously calculated, but also their indexes of earliest occurrence or other properties of their respective sentence sets. In the preferred embodiment, W(a,b) is equivalent to Average(w(a),w(b))*C(a,b), where w(a) and w(b) are the scores of a and b in the element list, and C(a,b) is said to be zero (0) where element a and element b are the same element and C(a,b) is said to be one (1) where elements a and b are distinct. It should be understood that function C(a,b) is not a necessary component of the present invention but an implementation of the preferred embodiment designed to de-emphasize the significance of element-pairs consisting of the pairing of an element with itself, and that any function W(a,b) that computes an intermediate value for an element-pair based on the attributes of its constituent elements is within the scope and intent of the present invention.

Each element-pair (a,b) is additionally processed with respect to a function D(a,b), which takes into account the least number of sentences by which the two elements a and b are separated in the topical selections. This measure of separation is called the sentence radius of element a with respect to element b (and vice versa, since the element-pairs are unordered). As examples: if elements a and b occur within the same sentence, the sentence radius of elements a and b, or D(a,b), is said to be zero (0); if element a and element b occur in neighboring sentences, but not in the same sentence, then the radius D(a,b) is said to be one (1); if element a occurs in the sentence next but one to a sentence containing element b, but not in any nearer sentence, then the sentence radius D(a,b) is said to be two (2).

For each element-pair (a,b) and its sentence radius D(a,b), the radius D(a,b) is compared to a value R representing a threshold sentence radius by means of a function S(a,b), as described below. In the preferred embodiment, R is configurable.

The function S(a,b) may be defined as any function that qualifies the relationship between D(a,b) and R. In the preferred embodiment, the function S(a,b) can take two values, zero (0) and one (1), determined as follows: if D(a,b) is numerically greater than R, then S(a,b) is said to be equal to zero (0); if D(a,b) is numerically less than or equal to R, then S(a,b) is said to be one (1).

Having arrived at values for W(a,b) and S(a,b) for a given element-pair (a,b), the element-pair is further processed with respect to a function F(a,b), which is a function of W(a,b) as already computed and S(a,b) as already computed. The value of F(a,b) is the final measurement of the element-pair's significance to the topical content of the document, its Sentential Affinity value, and may be defined as any function of W(a,b) and S(a,b). In the preferred embodiment, F(a,b) is the product of W(a,b) and S(a,b):

$$F(a,b)=W(a,b)*S(a,b)$$

Having computed the SA value for each element-pair and having assigned the node of each element-pair in the matrix of elements the corresponding SA value, we have now completed construction of said matrix. The now completed matrix, is the SA Matrix. FIG. 2 shows a sample SA Matrix constructed from the elements illustrated in FIG. 1, according to the preferred embodiment.

For the purposes of constructing the SA Matrix illustrated in FIG. 2, the value of R used in calculating S(a,b) was said to be two (2). Consequently, those element-pairs whose elements do not occur in the same or neighboring sentences, as illustrated by the sentence sets detailed in FIG. 1, have a value of S(a,b) said to be zero(0). As the preferred embodiment calculates the value of F(a,b) to be a product of S(a,b), F(a,b) is also said to be zero (0), as represented by the zero (0) node values in FIG. 2. In summary, for nodes for which S(a,b) is said to be zero (0) per the functions of the preferred embodiment, as previously explained:

$$F(a,b)=W(a,b)*S(a,b)=W(a,b)*0=0$$

Similarly illustrated in FIG. 2 is the calculation of those nodes representing the pairing of an element with itself. As implemented in the preferred embodiment, the value of W(a, b) is a function of the Average(w(a),w(b)) and C(a,b), where the value of C(a,b) is set to zero (0) in the case being considered, as previously described. Consequently, in the preferred embodiment and as illustrated in FIG. 2, where a node represents a pairing of an element with itself:

$$F(a,b)=W(a,b)*S(a,b)=(\text{Average}(w(a),w(b))*0)*S(a,b)\\=0$$

In FIG. 2, those element-pairs for which S(a,b) is said to be one (1) according to the preferred embodiment, being those element-pairs whose elements occur within the same or neighboring sentences, and for which C(a,b) is said to be one (1), being those element-pairs whose elements are unique, have nodes to which a value F(a,b) has been assigned such (where "Average" has been abbreviated as "Avg."):

$$F(a,b)=W(a,b)*S(a,b)=(\text{Avg.}(w(a),w(b))*1)*1=\text{Avg.}\\(w(a),w(b))$$

It should be obvious to those of ordinary skill in the art that some definitions of the functions W(a,b), S(a,b), and F(a,b) may allow for one or more of said functions to assign an SA value to a node that can be determined without requiring all functions to be evaluated for said node. For example, as has already been described for the preferred embodiment, the nodes representing a pairing of an element with itself are invariably assigned an SA value of zero (0), the object of which is to devalue the significance of all such pairings. It should be understood that in cases where determination of the SA value does not require the evaluation of all functions, it makes no difference in practice whether all functions are evaluated nor whether the functions evaluated are evaluated in the order described for the preferred embodiment. It should be further understood that any combination of functions and procedural orderings of functions that result in equivalent SA values are functionally equivalent and all such variations are within the full scope and intent of the present invention.

Similarly, it should be understood that embodiments are functionally equivalent and within the spirit and scope of the present invention that process all element-pairs one function at a time or that process all functions one element-pair at a time, as well as embodiments "in between," which may employ a procedural order not foreseen by the present description but which result in equivalent SA Matrices to the mentioned embodiments.

Those of ordinary skill in the art will further recognize that the SA Matrix can be represented in a variety of structures, including but not limited to a vector format, and that the resulting structure can be truncated using a variety of common methods. In most embodiments, it will be desirable to truncate the representation to eliminate all element-pairs whose magnitudes are less than zero.

In the preferred embodiment, the SA Matrix is rendered as a vector (FIG. 3) in which the unique, unordered element-pairs (a,b) form the dimensions of the vector, and the scores F(a,b) form the magnitudes. The vector of the preferred embodiment is truncated both at a fixed but configurable number of dimensions and truncated to contain only positive, non-zero values. FIG. 3 shows a vector representation of the SA Matrix illustrated in FIG. 2, truncated to exclude values less than zero.

The invention in which an exclusive right is claimed is defined by the following:

1. A computer-implemented method comprising:
    analyzing a document to identify elements within the document, wherein elements are words or phrases that explicitly appear in the document;
    assigning an element score to each of one or more of the elements, the element score indicating the element's significance to topical content of the document;
    generating a matrix of element-pairs from the elements identified within the document, and for one or more of the element-pairs, calculating an element-pair score indicating the element-pair's significance to topical content of the document; and
    generating a sentence set for one or more elements identified within the document, the sentence set comprising ordinal values indicating sentences in which the elements occur, wherein said calculating an element-pair score indicating the element-pair's significance to topical content of the document includes weighting the element-pair score based, in part, on a measure of a shortest distance between occurrences of the elements of the element-pair, as indicated by the sentence sets associated with each element-pair, whereby the sentence set is stored in memory and used by information retrieval systems,
    whereby element-pair scores are stored as a data structure and executable by information retrieval systems.

2. The computer-implemented method of claim 1, wherein calculating an element-pair score indicating the element-pair's significance to topical content of the document includes calculating the element-pair score as a function of the individual element scores associated with the elements of the element-pair.

3. The computer-implemented method of claim 1, wherein assigning the element score to each of the one or more elements includes generating the element score based, in part, on a measure of the frequency with which the element occurs in the document.

4. The computer-implemented method of claim 1, wherein assigning the element score to each of the one or more elements includes weighting the element score based, in part, on determining if the element occurs in a particular section or sentence of the document.

5. The computer-implemented method of claim 1, wherein assigning the element score to each of the one or more elements includes weighting the element score based, in part, on determining if the element is included in a predetermined list of words and/or phrases.

6. The computer-implemented method of claim 1, wherein analyzing a document to identify elements within the document includes processing the document to select words and/or phrases, which are representative of topical content of the document, in accordance with one or more predetermined criteria such as discarding sections of the document except a title and a body, discarding navigation elements of the document on an HTML page, and discarding components of the document whose size falls below a configurable threshold.

7. The computer-implemented method of claim 1, wherein analyzing a document to identify elements within the document includes eliminating text determined not to be representative of topical content of the document.

8. The computer-implemented method of claim 7, wherein eliminating text determined not to be representative of topical content of the document includes eliminating text based on a determination that the text corresponds to parts of speech not representative of topical content of the document.

9. The computer-implemented method of claim 7, wherein eliminating text determined not to be representative of topical content of the document includes eliminating text determined to be present in a predefined list of words.

10. The computer-implemented method of claim 1, wherein analyzing a document to identify elements within the document includes constructing a phrase from two or more words according to one or more predetermined criteria such as constructing sequences of adjectives and nouns, as determined by a setting of a configuration parameter.

11. The computer-implemented method of claim 1 wherein analyzing a document to identify elements within the document includes:
parsing the document into sections representing structural components of the document; and
analyzing only those sections determined to contain words and/or phrases representative of topical content of the document.

12. The computer-implemented method of claim 11, wherein assigning an element score to one or more elements includes generating a score on a per section basis, and combining scores from one or more sections to calculate the element score assigned to a particular element.

13. The computer-implemented method of claim 1, wherein analyzing a document to identify elements within the document includes analyzing stem forms of words so that two words with a common stem form are considered as the same element.

14. The computer-implemented method of claim 1, further comprising:
eliminating from the matrix those element-pairs with an element-pair score lower than a predetermined threshold.

15. The computer-implemented method of claim 1, wherein the matrix is manipulated to form a vector such that the dimensions of the vector are the element-pairs ordered by the element-pair score in descending order, and the magnitude in each dimension is the element-pair score, wherein element-pairs with an element-pair score lower than a predetermined threshold are eliminated from the vector.

16. A computer-implemented method comprising:
analyzing a document to identify textual elements within one or more sections of the document in accordance with one or more predetermined criteria such as discarding sections of the document except a title and a body, discarding navigation elements of the document on an HTML page, and discarding components of the document whose size falls below a configurable threshold, wherein textual elements are words or phrases that explicitly appear in the document;
assigning a base score to each textual element based on a measure of the frequency with which the textual element occurs in the document;
determining a sentence set for each textual element, the sentence set comprising ordinal values associated with sentences in which the textual element occurs within a section of the document; and
generating a matrix by pairing textual elements identified within the document to create element-pairs and assigning an element-pair a significance score calculated as a function of the base scores of each textual element in the element pair, wherein the significance score is weighted based on a shortest distance between textual elements within a section of the document, as indicated by the sentence set for each textual element in the element pair, whereby significance scores are stored as a data structure and executable by information retrieval systems.

17. The computer-implemented method of claim 16, wherein analyzing a document to identify textual elements within one or more sections of the document in accordance with one or more predefined document processing rules includes processing the document to select words and/or phrases, which are representative of topical content of the document, in accordance with the one or more predefined document processing rules.

18. The computer-implemented method of claim 16, wherein the base score is weighted based on the occurrence of the textual element in a particular section or sentence of the document.

19. The computer-implemented method of claim 16, wherein the base score is weighted based on the inclusion of the textual element in a predetermined list of textual elements.

20. The computer-implemented method of claim 16, wherein assigning a base score to each textual element based on a measure of the frequency with which the textual element occurs in the document includes generating a section score on a per section basis, and combining section scores from one or more sections to calculate the base score assigned to each textual element.

* * * * *

UNITED STATES PATENT AND TRADEMARK OFFICE
CERTIFICATE OF CORRECTION

PATENT NO. : 7,587,381 B1  Page 1 of 1
APPLICATION NO. : 10/350869
DATED : September 8, 2009
INVENTOR(S) : Remy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 573 days.

Signed and Sealed this

Twenty-first Day of September, 2010

David J. Kappos
*Director of the United States Patent and Trademark Office*